April 3, 1945. W. C. ROBERTS-HORSFIELD, JR 2,372,741
APPARATUS FOR ILLUSTRATING PROPELLER BLADE PITCH MOVEMENTS
Filed July 7, 1942
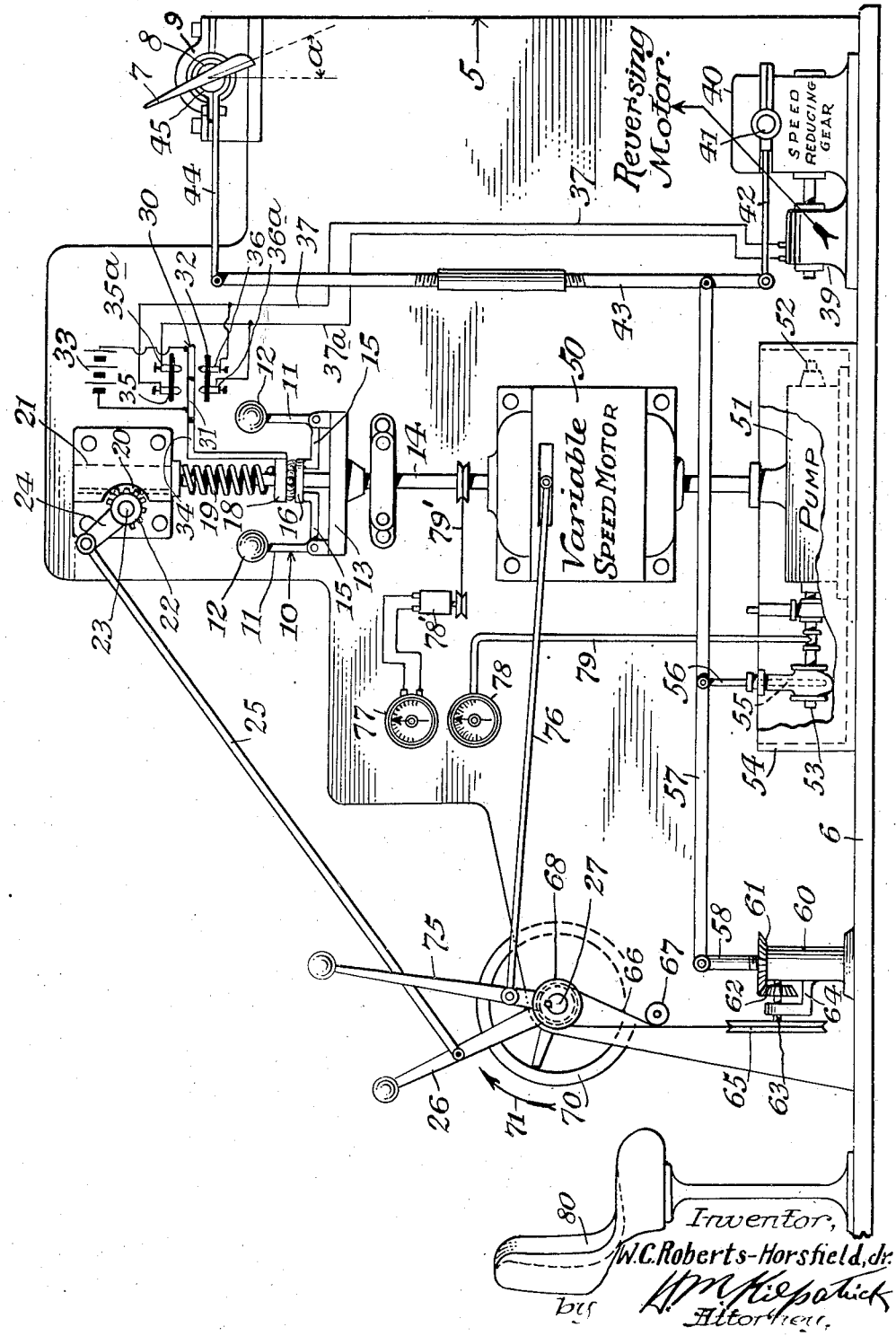
Inventor,
W.C.Roberts-Horsfield,Jr.
by  H.M.Kilpatrick
Attorney.

Patented Apr. 3, 1945

2,372,741

UNITED STATES PATENT OFFICE 2,372,741

APPARATUS FOR ILLUSTRATING PROPELLER BLADE PITCH MOVEMENTS

William C. Roberts-Horsfield, Jr., Plainfield, N. J.

Application July 7, 1942, Serial No. 449,984

35 Claims. (Cl. 35—12)

The subject matter of this application is a device for enabling a pupil of aviation to visualize and understand something of the movement of the blades of a variable pitch propeller such as occurs in the operation of some airplanes, dirigible balloons, or water craft. The apparatus illustrated and to which the claims are directed is a simulation of aircraft, and the changes in pitch are such as occur in ground testing for run up, in take-off, climbing flight, level flight, cruising speed, power descent, power diving, and gliding approach. Some of these operations can be performed by any power driven aircraft, while others can be performed only by airplanes.

In operating with the apparatus the application the pupil is directed to imagine that he is in an aircraft doing some or all of such evolutions in suitable succession, and as he imagines he is doing any particular operation he is shown by the simulation of the propeller how the actual propeller of an aircraft would change its pitch angle. This is of value to the student pilot as he can see the change in angle which would be impossible to see with a whirling airplane propeller and further there is no danger involved.

Engine operating conditions are indicated by a simulation of a standard tachometer which indicates the R. P. M. of the simulated engine operation and an especially calibrated pressure gauge to indicate the intake manifold pressure of the simulated engine.

The motor for driving the governor is a small variable speed electric motor although a small internal combustion engine, steam engine or other motor or turbine whose power and no-load speed can be controlled by a throttle or speed throttle lever might be used.

Coupled to the variable speed motor is a variable load such as an oil pump whose discharge is controlled by a loading valve which is connected by levers and adjustable link to the propeller blade whose pitch angle is controlled by the governor. As the blade angle is increased the loading valve is closed imposing a greater load on the variable speed motor as will be indicated by a reading of the manifold pressure gauge which is connected to the discharge conduit of the oil pump between it and the loading valve.

This added load on the motor, which is sensitive to load variation, slows it down, which in turn throws the governor out of the normal or balanced position, which is also called the "on speed" condition. The governor then operates means to decrease the blade angle until the loading valve is opened to a degree that will allow the motor to gain its original R. P. M., which in turn returns the governor to the "on speed" condition. This causes the blade angle to maintain a predetermined constant value.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

In the accompanying drawing showing, by way of example, one of many possible embodiments of the invention, the figure is a diagrammatic side elevation showing the apparatus.

The various parts of the apparatus are diagrammatically shown mounted on a panel 5 mounted on a base 6.

A longitudinal blade member 7 simulating or adapted to represent a propeller blade of an aircraft is shown mounted on an axial shaft 8 mounted in a bearing 9 on the panel for pivotally mounting the member for movement on its longitudinal axis of the member for increasing or decreasing the blade pitch. The pitch angle $a$ of the blade is controlled by the speed governor 10 as will be explained.

While practically any type of speed governor may be used the one shown here comprises L-shaped levers 11 weighted as at 12, and pivoted at the elbow part on a rotary disk 13 mounted fast on a shaft 14, rotated as will be explained.

The inner arms 15 of the levers press upwardly against a collar 16 loose on the shaft 14 and carrying ball bearings pressed upon by an upper collar 18 pressed downwardly by a control spring 19 having its upper rod pressing upwardly against a rack 20 slidable in a guide 21 and engaged by a pinion 22 mounted fast on a pivot shaft 23 journaled on the guide and carrying fast thereon a short lever 24 connected by a link 25 to a governor control lever 26 closely mounted on a shaft 27 rotatably mounted transversely in the control panel, whereby the pressure of the spring may be adjusted.

Connecting means are provided adapted to be operated by the governor member for increasing or decreasing the pitch of the blade member as the speed of the governor exceeds or goes below a certain predetermined limit. In actual aircraft such connecting means may be pressure oil operated means and/or electrically operated means, or mechanical or other suitable means. However, the means here shown may be any means which will accomplish the object and are for simplicity shown as electrical and mechanical and include a diagrammatically shown reversing switch 30 comprising insulated contact plates 31, 32 suitably connected to the respective poles of a source of current 33 and carried on a racket bar 34 carried on the collar 18 of the governor.

Said plates 31, 32 when raised as the weights 12 move outwardly by centrifugal force, come in contact with upper contacts 35, 35a respectively connected by conductors 37, 37a to terminals of a reversing motor 39 adapted to drive a speed reducing gear 40, the out-put shaft 41 of which carries a lever arm 42.

This reversing motor is so wound that when the governor speed rises and the upper contacts 35, 35a are engaged, the lever arm 42 is lowered. When the governor speed is reduced, the plates 31, 32 respectively engage the lower contacts 36a, 36 respectively connected to the conductors 37a, 37 thus connecting the contact plates 31, 32 to conductors 37a and 37 respectively, whereupon the direction of current in the motor is reversed and the lever arm 42 is raised.

In actual aircraft the pitch of the propeller is changed while rotating on the propeller shaft and requires complicated mechanism. In the present instance, the blade 7 need not, and does not, revolve on a propeller shaft, and only simple means are required for adjusting the blade pitch angle by the motor 39. This means is shown as comprising the motor 39, gear 40 and the lever arm 42 connected by an adjustable link 43 to the outer end of a lever 44 formed into an inner end strap 45 adjustably clamped on the shaft 8 of the blade 7.

When the contacts 36, 36a are engaged the arm 42, the lever 43, and lever 44 rise thus to decrease the blade pitch angle $a$; while the excessive speed of the governor causes the closing of the engagement of contacts 35, 35a, thus lowering the levers 42 and 44, increasing the pitch angle $a$ of the blade.

The variable speed motor 50, which may be any type of engine, turbine, electric motor or other type of motor and may be quite small represents the aircraft engine and drives the governor, which here is shown mounted on one end of the motor shaft 14. In aircraft practice excessive speed of the engine causes the governor-operated means to increase the blade pitch, which increases the load on the engine. In like manner excessive speed of the motor 50 causes the governor to increase the pitch of the blade 7, as above explained, and will increase the load on the motor 50 as will now be explained.

Means are provided indirectly controlled by the governor, as will be explained for restraining the motor 50 to predetermined limits. This means may comprise suitable means for varying the relation between the driving force and resistance to the rotation of the motor. For instance, the motor shaft may be resisted by a suitable brake or other type of load, for instance a pump. As shown the lower end of the motor shaft operates a rotary oil pump 51 which may be of the gear type, having an intake 52 and a discharge pipe 53 all mounted in an oil tank 54. The motor 50 operates to draw in oil from the tank at the intake 52 and discharge it into the tank from the pipe 53.

A variable load for the pump and motor is provided by means of an adjustable gate-valve 55 or other suitable loading valve, controlled by a gate-valve rod 56 pivotally connected to a loading lever 57 pivoted at its fulcrum end to an adjustable fulcrum 58 and pivoted at the other end to the link 43.

When excessive speed of the governor causes contacts 35, 35a to be engaged the pitch of the blade 7 is increased as above described, the link 43, levers 42, 44 and 57 and valve rod 56 are lowered thus increasing the load on pump and motor until they and the governor slow down enough to break contact at 35, 35a deenergizing the motor 39 and allowing the blade 7 and valve 55 to remain stationary at least momentarily.

Should the speed continue to drop, the contacts 36, 36a will be engaged, the motor 39 will operate in reverse direction to the levers 42, 44 and 57 and the valve will rise decreasing the blade pitch and decreasing the load on the pump and motor 50.

Should the airplane climb the propeller load would increase and should it nose down the propeller load would decrease. In the apparatus these changes of load are simulated by lowering and raising the fulcrum 58, thus closing and opening the loading valve 55.

The fulcrum 58 may comprise a screw of a small jack 60, the screw being movable in an interiorly threaded miter gear 61 rotated by another miter gear 62 mounted on a shaft 63 rotatable in a bearing bracket 64 and carrying a pulley 65 around which is engaged a belt 66 disposed against an idler 67 and around a drive pulley 68 fast on the shaft 27 on which is fast also a hand wheel 70. The belt and pulley are so arranged that when the wheel 70 is moved in nosing down direction as indicated by the arrow 71, the fulcrum 58 and the gate-valve 56 will rise thus decreasing the load on the pump and the motor 50. Movement of the wheel 70 in reverse direction simulates climbing and causes reverse movements and effects.

The speed of the motor 50 is controlled by the hand lever 75 connected by a link 76 to the speed changing member of the variable speed motor 50.

A pressure gauge 78 is controlled by oil pressure in the pipe 79 connected to the pump discharge pipe 53 between the pump and loading valve 55. This gauge is calibrated to simulate the readings of the intake manifold pressure of the simulated engine in inches or centimeters of mercury in a mercury tube.

Manifold pressure may also be indicated on a specially calibrated ammeter controlled by the current which runs the electric motor which drives the constant speed governor.

The dial 77 of the tachometer 78' driven by a pulley and belt connector 79' from the main motor shaft 14 is calibrated to give readings to simulate the readings of the simulated aircraft engine.

A seat 80 for the pupil operator may be placed in any convenient position; and while a single seat and single set of control levers are shown rather than dual control it is understood that the invention as claimed is not thus limited.

In actual flying practice it is essential to be thoroughly familiar with all variations of the following:

A. Overspeed caused by—
    (1) Opening the throttle,
    (2) "Nosing ship down."
B. Underspeed caused by—
    (1) Closing throttle,
    (2) Pulling ship into climb
C. Optimum R. P. M. for take-off climbing and cruising.

The varying propeller pitch may be very effectively taught in fixed position on the ground with my apparatus as follows:

A. Overspeed

1. Opening the throttle, that is increasing the motor speed, by means of the hand lever 75, increases the power supplied to the pump 51 thus increasing the pressure in the pipe 53 which is indicated on the manifold pressure gauge 78. The added power also increases the R. P. M. of the motor 50 which is indicated on the tachometer 77. The increase in R. P. M. unbalances the governor, and the governor raises the contact plates 31, 32 to contacts 35, 35a and increases the blade pitch angle a which starts the motor 39 and closes the loading valve 55, which decreases the R. P. M. to the original value maintained before the throttle was opened, the only resulting changes are the indicated increased manifold pressure shown on the gauge 78 and the larger blade angle which may be easily observed and measured due to the fact that the propeller blade 7 is not rotating.

2. Propeller pitch change of "nosing the ship down" is simulated by turning the hand wheel 70 in the nose-down direction, which raises the fulcrum point 58 and opens the loading valve 55, which in turn reduces the load on the motor 50 allowing it to increase its R. P. M. The opening of the valve 55 causes the indicated manifold pressure to drop and the R. P. M. of the motor 50 and the governor increases until unbalanced condition of governor closes the contact at 35, 35a, lowers the arm 42, increases blade angle to such a degree that the valve 55 closes until the original load is imposed on the motor 50, thus returning the motor and governor to the original "on speed" condition. The only change observed is the increased blade angle suitable for increased forward speed of the simulated airplane which takes place when the ship is nosed down.

B. Underspeed

1. Movement of the hand lever 75 to simulate closing the throttle, decreases the speed and power of the motor 50, which decreases the pressure in the discharge pipe 53 of the pump, which is indicated on the manifold pressure gauge 78. This decrease in power allows the motor 50 to slow down, thus throwing the governor out of balance into the underspeed condition, thus closing the contacts 36, 36a, starting the motor 39 in reverse direction, raising the lever arm 42 decreasing the blade angle a and opening the loading valve 55 which reduces the load on the motor 50 which allows it to regain its original R. P. M., the resulting indications being reduced pressure and the smaller pitch angle of the blade 7.

2. "Pulling ship into climb" may be accomplished by turning the hand wheel 70 in nose up direction which lowers the fulcrum 58 which in turn closes the loading valve 55, thus decreasing the R. P. M. of the motor 50, causing an indication of increased manifold pressure on the gauge 77 and low R. P. M. reading on the tachometer dial 77 and causing the governor to lower the contact plate 31, 32 to engage contacts 36, 36a and raise the lever 42 and 57 decreasing the blade angle and opening the valve 55 to reduce the load on the motor 50 allowing it to regain original R. P. M., which again stabilizes governor, resulting in the original R. P. M. and manifold pressure, and decreased blade angle.

C. Optimum R. P. M.

The conditions for optimum R. P. M. for "take-off," climb, and cruising are simulated by adjusting the governor control lever or speed control lever 26, as it is sometimes called, forwardly, thus lowering the rack 20, compressing the spring 19, thus requiring greater speed to close the contacts 31, 32, 35, 35a. After setting the speed lever, the governor will always maintain the adjusted R. P. M. by causing the motor 39 to adjust the lever 57 thus changing the blade angle and the adjustment of the loading valve 55.

It is obvious that the same apparatus may control two or more propeller simulations to enable the pupil better to visualize the feathering which occurs in variable pitch propellers in aircraft having more than one power plant. The value of the foregoing is very apparent, as the use of the apparatus eliminates large expenditures for test houses, engines, fuel and the like. Also the apparatus and its operation are inherently safe, there being no whirling propeller, or danger of serious engine damage due to overspeeding or excessive manifold pressure. Furthermore actual cockpit arrangement may be made of all controls and instruments.

The invention claimed is:

1. A demonstration apparatus comprising a propeller blade simulating member mounted for change of pitch movements; a variable speed motor; control means operated by the motor for moving said member to change the pitch in a direction corresponding to whether the motor speed departs above or below predetermined limits; means for effecting reduction of the motor speed including a movable member operable by said control means for adjusting such reduction when the pitch angle changes.

2. In combination, a propeller blade simulating member mounted for movement for change of pitch movements; a motor; and means operated by the motor for moving said member in opposite directions respectively as long as the motor speed departs above or below predetermined limits and for restoring the motor speed to said limits.

3. In combination, a propeller blade simulating member mounted for movement for change of pitch movements; a motor; means operated by the motor for moving said member to vary the indication on the departure of the motor speed from predetermined limits; means for effecting reduction of the motor speed and including a movable member operable by movement of the propeller blade simulating member for adjusting such reduction.

4. In a combination as in claim 3, an adjustable member; means operatively connecting said adjustable member and movable member for adjusting said reduction.

5. A non-traveling demonstration apparatus comprising a propeller blade simulating member mounted for movement for change of pitch; a variable speed motor; means operated by the motor for moving the propeller blade simulating member to vary the indication on the departure of the motor speed from predetermined limits; means for effecting reduction or increase of the motor speed including a movable member operated by said control means for adjusting said reduction or increase when the indicated pitch angle changes in a direction corresponding to said reduction or increase; and an adjustable member, connected to said movable member for adjusting the latter.

6. An apparatus as in claim 5 comprising means operatively connecting said propeller blade simulating member and movable member to adjust said reduction or increase whenever the propeller blade simulating member and/or the adjustable member is correspondingly moved.

7. An apparatus for illustrating the change of pitch in changeable pitch propellers, said apparatus comprising a propeller blade simulating member mounted for change of pitch movements; a variable speed motor to simulate an engine; a governor rotated by the motor for moving the propeller blade simulating member in one direction or the opposite direction when the governor respectively goes above or below predetermined limits; an adjustable load means driven by the motor and including a movable member operable for adjusting the resistance of the load; an adjustable member; and a differential means operatively connecting said members for moving the movable members to adjust the load whenever the propeller blade simulating member and/or the adjusting member is moved.

8. An apparatus as in claim 7 comprising means for adjusting said predetermined limits of the governor speed.

9. An apparatus as in claim 7 comprising means operable by the load means as a function of said resistance and having an indicator calibrated in units of intake manifold pressure of the simulated engine.

10. An apparatus as in claim 7 comprising a tachometer driven by the motor and calibrated to indicate R. P. M. of the simulated engine.

11. An apparatus as in claim 7 said propeller blade simulating means comprising a blade at all times axially stationary relative to the apparatus as a whole and pivotally mounted on its longitudinal axis to simulate blade pitch.

12. Apparatus as in claim 7 said differential comprising a lever fulcrumed at one end on said adjustable member, at the other end operatively connected to the propeller blade simulating member, and intermediately connected to said movable member.

13. In combination, an indicating member mounted for variable angular movement for change of pitch movements; a variable speed motor; a governor driven by the motor; means operated by the governor for changing the pitch angle of the member as the motor speed departs from a predetermined limit; a load means driven by the motor for simulating the craft propeller load; a loading means for adjusting the resistance of the load and having a movable member operable to effect said adjustment; an adjustable fulcrum; a loading lever intermediately connected to the movable member of the loading means and having one end pivoted to said fulcrum and the other end operatively connected to the propeller blade simulating member; said lever, indicating and movable members and fulcrum so related that movement of the fulcrum and movement of the propeller blade simulating member will adjust said movable member; and means for at will adjusting said fulcrum.

14. In combination a blade member simulating a craft propeller blade; means pivotally mounting the member for movement on its longitudinal axis for increasing or decreasing the blade pitch; a variable speed motor representing the simulated craft motor; a governor driven by the motor; means operated by the governor for progressively increasing or decreasing the blade pitch as long as the governor respectively exceeds or goes below a certain predetermined limit; an oil pump driven by the motor having intake and discharge conduits; a loading valve in the discharge conduit having a loading member adapted to progressively restrict or open the valve; a fulcrum member; a loading lever connected to the loading valve and pivoted to said fulcrum member; a radial lever arm connected to the blade and operatively connected to the loading lever; said levers being so related as to progressively close the loading valve when the blade pitch is progressively increased.

15. In a combination as in claim 14 comprising means for at will adjusting said fulcrum to move the loading member toward or from closing position.

16. An apparatus comprising, a longitudinal blade member simulating or adapted to represent a propeller blade of aircraft; means pivotally mounting the member for movement on a longitudinal axis of the member for increasing or decreasing the blade pitch; a governor; means operated by the governor respectively for increasing or decreasing the pitch of the blade member as long as the speed of the governor exceeds or goes below a certain predetermined limit; a motor of relatively low power for representing the aircraft engine; an operative connecting means between the motor and governor for driving the latter; an oil tank; an oil pump driven by the motor and providing a loading for the motor receiving oil from the tank and discharging it into the tank for simulating the load of the aircraft propeller placed on the aircraft motor; a loading valve in the discharge conduit of the pump and having a loading member adapted to be raised or lowered; a fulcrum; a loading lever intermediately connected to the loading valve and having one end pivoted to said fulcrum; a lever adjustably connected to the blade substantially radial to the axis of the blade; a link operatively connecting the last named lever and the loading lever; said links and levers being so related as to move the loading valve in closing direction when the pitch of the blade is increased.

17. An apparatus as in claim 16 comprising manual means for vertically adjusting said fulcrum to move the loading member toward or from closing position to simulate the change of load due to change of inclination of aircraft.

18. An apparatus as in claim 16 comprising a pressure gauge connected to the pump discharge conduit and calibrated to represent inches of mercury of the pressure of the intake manifold of the simulated aircraft engine.

19. Apparatus as in claim 16 comprising a tachometer operatively connected to and driven by the motor and calibrated to indicate the speed of the represented aircraft engine.

20. Apparatus as in claim 16 comprising means for at will adjusting the governor to vary said limit of the governor speed.

21. An apparatus comprising an indicating member mounted for movement for indicating changes; a variable stress device; movable means pressed upon by said device and operable for moving the indicating member to vary the indication on the departure of the stress of the device from predetermined limits; means adapted while the indicating member is stationary or moving, to restrain said stress; operating means operating whenever the indicating member moves for adjusting such restraint.

22. Apparatus as in claim 21 comprising an adjustable means and cooperating with the operating means for adjusting said restraint whenever the indicating member and/or the adjustabe means is moved.

23. A non-traveling apparatus comprising an indicating member mounted for movement for indicating pitch angle changes; a movable part; variable stress means adapted to press on said part with a variable stress; means operated by said part for moving the indicating member to vary the indication on the departure of said stress from predetermined limits; means operative while the indicating member is stationary and while the indicating member is moving for restraining said stress and including a movable member operable by movement of the indicating member for adjusting such restraint.

24. Apparatus as in claim 23 comprising an adjustable member; and means operatively connecting said adjustable member and movable member for adjusting said restraint when the adjustable member is adjusted or when the movable member is operated.

25. An apparatus comprising a propeller blade simulating member mounted for variable angular movement for indicating propeller blade pitch; mechanism having a part mounted for upward movement and means to push upwardly on said part with variable stress; a compression spring mounted to yieldably press downwardly on said part; operating means operated by said part for changing the pitch angle of the propeller blade simulating member as said stress departs from a predetermined limit; additional means for producing resistance opposing said stress; means for adjusting said resistance of the additional means and having a movable member operable to effect said adjustment; and actuating means operated by the indicator operating means when operated for operating the adjusting means.

26. Apparatus as in claim 25, said actuating means comprising an adjustable fulcrum; a loading lever intermediately connected to said movable member of the loading means and having one end pivoted to said fulcrum and the other end operatively connected to the indicator operating means; said lever, propeller blade simulating and movable members and fulcrum being so related that movement of the fulcrum and movement of the propeller blade simulating member will adjust said movable member; and means for at will adjusting said fulcrum.

27. A non-traveling apparatus comprising a propeller blade simulating member mounted for variable angular movement for indicating propeller blade pitch; mechanism including a part mounted for upward movement; variable stress means for yieldably pressing said part upwardly with a variable stress; means for varying said stress; a compression spring mounted to yieldably press downwardly on said part; means operated by said part for progressively changing the angle of said propeller blade simulating member as long as said stress exceeds or goes below a certain predetermined limit; resistance means operating when the propeller blade simulating member is moving and when the propeller blade simulating member is at rest for exerting a resistance on said variable stress means for reducing said variable stress; means for adjusting the resistance of said resistance and having a member movable to effect such adjustment; a fulcrum; a loading lever intermediately connected to the movable means and having one end pivoted to said fulcrum; a radial lever connected to the indicating member and operatively connected to the loading lever; said movable means and said levers being so related as to increase the resistance of the resistance means when the pitch of the blade is increased; and means for at will adjusting said fulcrum to move said movable means.

28. An apparatus operative while not traveling and comprising a propeller blade simulating member mounted for movement for change of pitch movements; a motor; means operated by the motor for moving the propeller blade simulating member to vary the indication of the member on the departure of the motor speed from predetermined limits; restraining means adapted while the indicating member is stationary or moving, to restrain the speed of the motor; and operating means, operated whenever the propeller blade simulating member moves for adjusting such restraint.

29. Apparatus as in claim 28 comprising an adjustable means and cooperating with said operating means for adjusting said restraint whenever said propeller blade simulating member and/or the adjusting means is moved.

30. A non-traveling apparatus comprising a propeller blade simulating member mounted for change of pitch movements; a motor; means operated by the motor for moving the propeller blade simulating member to vary the indication on the departure of the motor speed from predetermined limits; means adapted to operate while the propeller blade simulating member is stationary, for effecting restrain of the motor speed and including a movable member operable by movement of the propeller blade simulating member for adjusting such restraint.

31. Apparatus as in claim 30 comprising an adjustable member; and means operatively connecting said adjustable member and movable member for adjusting said restraint.

32. An apparatus comprising a propeller blade simulating member mounted for change of pitch movements; a motor; a governor rotated by the motor and operatively connected to said member for moving the indicating member when the governor speed goes above or below predetermined limits; and adjustable load means adapted to be driven by the motor when the indicator is stationary and including a movable member operable for adjusting the resistance of the load.

33. An apparatus as in claim 32 comprising an adjustable member; means operatively connecting said members for moving the movable members to adjust the load whenever the propeller blade simulating member is moved and when the adjusting member is moved.

34. An apparatus adapted for operation while stationary, and comprising a propeller blade simulating member mounted for change of pitch movements; a variable speed motor; a governor driven by the motor; means operated by the governor for changing the pitch angle of the member as long as the motor speed departs from predetermined limits; a load means driven by and restraining the motor when the propeller blade simulating member is stationary or moving; a loading means for adjusting the resistance of the load and having a movable member operable to effect said adjustment; an adjustable fulcrum; and a loading lever intermediately connected to the movable member of the loading means and having one end pivoted to said fulcrum and the other end operatively connected to the propeller blade simulating member.

35. A blade member simulating a craft propeller blade; means pivotally mounting the member for movement on its longitudinal axis of the member for increasing or decreasing the blade pitch; a variable speed motor representing the simulated craft motor; a governor driven by the motor; means operated by the governor for increasing or decreasing the blade pitch of the member as long as the governor exceeds or goes below a certain predetermined limit; an oil tank; an oil pump driven by the motor and receiving oil from the tank and discharging it into the tank for simulating the craft propeller load; a loading valve on the discharge conduit of the pump and having a loading member adapted to gradually close or open the valve; and means operatively connecting said blade member and valve for operating the latter.

WILLIAM C. ROBERTS-HORSFIELD, JR.